US011101126B2

(12) United States Patent
Liu et al.

(10) Patent No.: US 11,101,126 B2
(45) Date of Patent: Aug. 24, 2021

(54) METHOD AND SYSTEM FOR MEASURING INERT GAS BY ION PROBE

(71) Applicant: INSTITUTE OF GEOLOGY AND GEOPHYSICS, CHINESE ACADEMY OF SCIENCES, Beijing (CN)

(72) Inventors: Yu Liu, Beijing (CN); Guoqiang Tang, Beijing (CN); Qiuli Li, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 16/754,629

(22) PCT Filed: Dec. 4, 2018

(86) PCT No.: PCT/CN2018/119204
§ 371 (c)(1),
(2) Date: Apr. 8, 2020

(87) PCT Pub. No.: WO2020/113426
PCT Pub. Date: Jun. 11, 2020

(65) Prior Publication Data
US 2021/0057204 A1   Feb. 25, 2021

(51) Int. Cl.
*H01J 49/24* (2006.01)
*H01J 49/14* (2006.01)
(Continued)

(52) U.S. Cl.
CPC .......... *H01J 49/24* (2013.01); *H01J 49/0463* (2013.01); *H01J 49/142* (2013.01); *H01J 49/147* (2013.01); *H01J 49/282* (2013.01)

(58) Field of Classification Search
CPC .... H01J 49/0463; H01J 49/142; H01J 49/147; H01J 49/24; H01J 49/282
See application file for complete search history.

(56) References Cited

U.S. PATENT DOCUMENTS

| 2003/0008404 A1* | 1/2003 | Tomita | G01N 23/203 436/72 |
| 2008/0277576 A1* | 11/2008 | Komatsu | H01J 49/142 250/287 |
| 2017/0352528 A1* | 12/2017 | Schwieters | H01J 49/30 |

FOREIGN PATENT DOCUMENTS

| CN | 102141539 A | * | 8/2011 |
| CN | 102841127 A | | 12/2012 |

(Continued)

OTHER PUBLICATIONS

Ling et al, "Monazite RW-1: a Homogenous Natural Reference Material for SIMS U—Pb and Th—Pb Isotopic Analysis", Minter Petrol (2017) 111:163-172 (Year: 2017).*

(Continued)

*Primary Examiner* — David E Smith
(74) *Attorney, Agent, or Firm* — Ohlandt, Greeley, Ruggiero & Perle, L.L.P.

(57) ABSTRACT

A method and system for measuring an inert gas by an ion probe. Embedding a to-be-measured sample into an epoxy resin, to obtain a sample target, where the to-be-measured sample includes an inert gas atom; after putting the obtained sample target into an analysis chamber of the ion probe, vacuumizing the analysis chamber, where the ion probe includes a primary ion source, an electron gun, a mass analyzer, and an ion detector; bombarding the sample target by using a primary ion beam formed by the primary ion source to release the inert gas atom in the sample target; ionizing the released inert gas atom by using an electron beam formed by the electron gun to form an inert gas ion; and analyzing a secondary ion containing the inert gas ion by using the mass analyzer and the ion detector to achieve measurement of the inert gas.

20 Claims, 2 Drawing Sheets

(51) Int. Cl.
      *H01J 49/28*       (2006.01)
      *H01J 49/04*       (2006.01)

(56) References Cited

FOREIGN PATENT DOCUMENTS

| CN | 203733758 U | | 7/2014 |
|---|---|---|---|
| CN | 105103265 A | | 11/2015 |
| CN | 105548339 A | * | 5/2016 |
| CN | 107462622 A | | 12/2017 |

OTHER PUBLICATIONS

International Search Report dated Sep. 24, 2019 from International Patent Application No. PCT/CN2018/119204, 11 pages.
Yiping, Chen and Shuyong, Yu, "Monte-Carlo Stimulation of Atom-State Chemisorbed Gas Desorption Cross Section By Low-Energy Ions Induction", Chinese Journal of Computational Physics, vol. 9, No. 1, Mar. 1992, 6 pages.

* cited by examiner

METHOD AND SYSTEM FOR MEASURING INERT GAS BY ION PROBE

TECHNICAL FIELD

The present invention relates to the field of geoscience, and in particular to a method and system for measuring an inert gas by an ion probe.

BACKGROUND

The uranium/thorium-helium (U/Th—He) dating technique is a radioisotope dating method that uses radioactive elements of uranium/thorium (U/Th) to release a decay product of helium (He) during the decay process and calculates the age by measuring a ratio of He to U/Th. For specific decay processes, see the following three decay formulas.

$$^{238}U \rightarrow 8\alpha(He) + 6\beta^- + ^{206}Pb$$

$$^{235}U \rightarrow 7\alpha(He) + 4\beta^- + ^{207}Pb$$

$$^{232}Th \rightarrow 6\alpha(He) + 4\beta^- + ^{208}Pb$$

The geologic age of a sample can be calculated based on respective decay constants of the above three decay formulas and measured respective contents of uranium, thorium, and helium in the sample. For example, the uranium/thorium-helium dating technique of apatite provides unique data support for mountain uplift, tectonic evolution, glacial development, climate changes, or the like due to its special diffusion characteristics and closure temperature, and the samples involved include zircon, apatite, sphene, rutile, baddeleyite, monazite, and the like.

The traditional uranium/thorium-helium (U/Th—He) dating technique requires separate measurement of He content and U—Th content of the sample, and the process includes:

1) measuring the He content: wrapping the sample into a capsule by using high-purity platinum, leaving an opening (facilitating He diffusion), heating to 800-1500° C. by a laser, releasing He atoms in its crystal lattice, mixing the extracted gas and an He isotope diluent (gas) to enter an inert gas purification system for removing reactive gases (such as $H_2$, CO, $CO_2$, $H_2O$, or the like), then introducing into a conventional inert gas mass spectrometer for analysis, and calculating the He content of the sample by the measured $^3He/^4He$ ratio, and the isotope ratio (known) and molar content (known) of the added diluent; and 2) measuring the U—Th content of the sample: dissolving the foregoing laser-heated sample (for example, the sample capsule) and the U/Th diluent into a solution by using nitric acid (or other solvents), and passing into a mass spectrometry (such as an inductively coupled plasma-quadrupole mass spectrometry, ICP-QMS) for measurement. In this way, a ratio of $^{235}U/^{238}U$ to $^{230}Th/^{232}Th$ can be obtained through mass-spectrometer measurement, and the U—Th content of the sample can be calculated based on the addition amount (known) of the diluent and the ratios (known) of $^{235}U/^{238}U$ and $^{230}Th/^{232}Th$ in the diluent.

The foregoing traditional uranium/thorium-helium (U/Th—He) dating technique has the following several disadvantages:

1) Since a certain amount of energy is released during radioactive decay, the produced He atoms can be emitted to tens of microns. Thus, at the edge of crystal particles, some He atoms may be emitted to the outside of the crystal, causing loss of He, resulting in inaccurate calculation. Although the calculation result can be corrected through a series of calculations, the process requires several assumptions and the process causes unpredictable calculation errors.

2) The traditional uranium/thorium-helium dating technique uses a variety of isotope diluents, and errors in the addition amount of diluent and errors in the isotope ratio may cause errors in the final chronological calculation.

3) In the traditional uranium/thorium-helium dating technique, the minimum sample analysis amount is a "single particle", so it can only be a single age history, and meaningful chronological data cannot be obtained for samples with multiple growth periods.

4) In the traditional uranium/thorium-helium dating technique, there are many steps and the operation is complicated due to the use of two mass spectrometer systems.

5) In the traditional uranium/thorium-helium dating technique, the inert gas analysis system (for example, including sample pretreatment, purification, and inert gas mass spectrometers) are extremely sensitive to the background, requiring a long baking process to reduce the system background each time the sample is replaced, so, the efficiency is relatively low.

SUMMARY

A primary object of the present invention is to provide a technique for measuring an inert gas by an ion probe, to solve any of the foregoing technical problems and other potential technical problems in the prior art.

To achieve the above purpose, embodiments of the disclosure provide a method for measuring an inert gas by an ion probe, including: embedding a to-be-measured sample into an epoxy resin, to obtain a sample target, where the to-be-measured sample includes an inert gas atom; after putting the obtained sample target into an analysis chamber of the ion probe, vacuumizing the analysis chamber, where the ion probe includes a primary ion source, an electron gun, a mass analyzer, and an ion detector; bombarding the sample target by using a primary ion beam formed by the primary ion source to release the inert gas atom in the sample target; ionizing the released inert gas atom by using an electron beam formed by the electron gun to form an inert gas ion; and analyzing a secondary ion containing the inert gas ion by using the mass analyzer and the ion detector to achieve measurement of the inert gas.

According to the embodiments of the disclosure, the primary ion beam formed by the primary ion source and the electron beam formed by the electron gun coincide with each other at a position on the surface of the sample target.

According to the embodiments of the disclosure, the electron gun includes an electron gun filament, an electron extracting pole, an electromagnetic lens, and an electron beam deflecting plate; the electron gun filament forms and emits an electron under the current heating; the intensity of the current passing through the electron gun filament, and the voltage between the electron gun filament and the electron extracting pole can be adjusted to control the current intensity of an emitted electron; the electromagnetic lens is configured to focus the electron onto the surface of the sample target to form the electron beam; and the voltage on the electron beam deflecting plate can be adjusted to change the position of the electron beam on the surface of the sample target.

According to the embodiments of the disclosure, the secondary ion realizes selection of the secondary ion of a specific mass-to-charge ratio under the action of the mass analyzer, and then the selected secondary ion enters the ion detector to realize measurement of the inert gas.

According to the embodiments of the disclosure, when the analysis chamber is vacuumized, a turbo molecular pump and an ion pump are simultaneously used, the ion pump is connected to the analysis chamber, and an isolation valve is placed between the turbo molecular pump and the ion pump; and the isolation valve is first opened when the analysis chamber is vacuumized, the analysis chamber is vacuumized to below $1 \times 10^{-7}$ Pa with the turbo molecular pump, and then the isolation valve is closed and the ion pump is started to further vacuumize to $1 \times 10^{-8}$ Pa.

According to the embodiments of the disclosure, a magnetic backboard is arranged at the back of the sample target, and the magnetic backboard is configured to form a magnetic field in a direction perpendicular to the surface of the sample target such that the electron beam moves along a substantially helical path after entering the magnetic field formed by the magnetic backboard.

According to the embodiments of the disclosure, when the to-be-measured sample is embedded in the epoxy resin to obtain the sample target, a standard sample is embedded in the epoxy resin; and after measuring an inert gas at a position on the sample target corresponding to the to-be-measured sample, the method further includes: bombarding the position on the sample target corresponding to the standard sample by using the primary ion, to release an inert gas atom in the standard sample; ionizing the inert gas atom released from the standard sample by using the electron beam, to obtain an inert gas ion of the standard sample; analyzing a secondary ion containing the inert gas ion of the standard sample by using the mass analyzer and the ion detector; and calibrating an analysis result of the to-be-measured sample by using an analysis result of the standard sample, thereby obtaining a corrected measurement result of the inert gas of the to-be-measured sample.

According to the embodiments of the disclosure, the ion probe may be a magnetic ion probe, a quadrupole ion probe, or a time-of-flight ion probe; and the to-be-measured sample may be zircon, apatite, sphene, rutile, baddeleyite, or monazite.

Embodiments of the disclosure further provide a system for measuring an inert gas by an ion probe, where the system uses the method described in any one of claims 1 to 8 to measure the inert gas, and the system includes a primary ion source, an electron gun, a mass analyzer, and an ion detector; where the electron gun includes an electron gun filament, an electron extracting pole, an electromagnetic lens, and an electron beam deflecting plate; the electron gun filament forms and emits an electron under the current heating; the intensity of the current passing through the electron gun filament, and the voltage between the electron gun filament and the electron extracting pole can be adjusted to control the current intensity of an emitted electron; the electromagnetic lens is configured to focus the electron onto the surface of the sample target to form the electron beam; the voltage on the electron beam deflecting plate can be adjusted to change the position of the electron beam on the surface of the sample target; and the secondary ion realizes selection of the secondary ion of a specific mass-to-charge ratio under the action of the mass analyzer, and then the selected secondary ion enters the ion detector to realize measurement of the inert gas.

According to the embodiments of the disclosure, a magnetic backboard is arranged at the back of the sample target, and the magnetic backboard is configured to form a magnetic field in a direction perpendicular to the surface of the sample target such that the electron beam moves along a substantially helical path after entering the magnetic field formed by the magnetic backboard.

Compared with the prior art, the present invention has the following advantages: the disclosure can provide a method and system for measuring an inert gas by an ion probe, thereby measuring an inert gas.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following describes the technical solutions in the embodiments of the present invention in detail with reference to the accompanying drawings in the embodiments of the present invention. Apparently, the described embodiments are merely a part rather than all of the embodiments of the present invention. All other embodiments obtained by a person of ordinary skill in the art without creative efforts on the basis of the embodiments of the present invention shall fall within the protection scope of the present invention.

An ion probe, also known as a secondary ion mass spectrometer, is a means of analyzing an elemental content or isotope ratios of in-situ micro-domains. For example, a large magnetic ion probe features high spatial resolution, high transmission efficiency, and high precision, allowing accurate analysis of the composition of most elemental isotopes on a micron scale. Therefore, it has an irreplaceable role in the fields such as earth origin, deep earth dynamics, lithospheric evolution, comparative planetology, mineral resources and global environmental changes.

The basic principle of an ion probe is that under high vacuum conditions, an ion probe emits an ion having a certain energy (hundreds of to hundreds of thousands of electron volts), and the ion is referred to as a primary ion, which is focused to form an ion beam and used to bombard the surface of a sample. Some ions are injected into the interior of a solid sample, and have elastic or inelastic collisions with atoms of the samples on its moving path. The internal atom that is of the solid and obtains energy by collision collide with other atoms around it and conduct the energy, and this process is referred to as cascade collision. In this process, some electrons, atoms, and molecules obtain enough energy to get rid of the acting force of the solid structure and escape into a vacuum environment, and this process is referred to as sputtering. A small portion (<10%) of the atoms or molecules being sputtered is lost or obtains one or more electrons, thus forming secondary ions. The elemental and isotopic compositions of the solid sample can be learned by performing mass spectrometric analysis after these secondary ions are extracted.

The secondary ion mass spectrometry has the advantages of in-situ, micro-region, high precision, and little sample consumption. It can analyze most of the elements in the periodic table, but it is difficult to ionize inert gases, so it is not suitable for analysis of inert gases. For this reason, all of the research related to inert gases hardly can use ion probes (that is, the current ion probe design cannot effectively analyze inert gases), and thus the advantages of ion probes cannot be utilized.

Embodiments of the disclosure provide a technique for measuring an inert gas by an ion probe, to utilize the advantages of the ion probe to measure the inert gas (for example, content of an inert gas such as helium).

As an example, the embodiments of the disclosure provide a method for measuring an inert gas by an ion probe. The method includes: embedding a to-be-measured sample into an epoxy resin mount, to obtain a sample target, where the to-be-measured sample includes an inert gas atom; after putting the obtained sample target into an analysis chamber of the ion probe, vacuumizing the analysis chamber, where the ion probe includes a primary ion source, an electron gun, a mass analyzer (taking a magnetic ion probe as an example, the mass analyzer may include an electrostatic analyzer and a magnetic field mass analyzer), and an ion detector; bombarding the sample target by using a primary ion beam formed by the primary ion source to release the inert gas atom in the sample target; ionizing the released inert gas atom by using an electron beam formed by the electron gun to form an inert gas ion; and analyzing a secondary ion containing the inert gas ion by using the mass analyzer and the ion detector to achieve measurement of the inert gas (for example, content of an inert gas such as helium).

As an example, the embodiments of the disclosure further provide a system for measuring an inert gas by an ion probe. The system uses the foregoing method to measure the inert gas, and the system includes a primary ion source, an electron gun, a mass analyzer, and an ion detector. The electron gun includes an electron gun filament, an electron extracting pole, an electromagnetic lens, and an electron beam deflecting plate; the electron gun filament forms and emits an electron under the current heating; the intensity of the current passing through the electron gun filament, and the voltage between the electron gun filament and the electron extracting pole can be adjusted to control the current intensity of an emitted electron; the electromagnetic lens is configured to focus the electron onto the surface of the sample target to form the electron beam; the voltage on the electron beam deflecting plate can be adjusted to change the position of the electron beam on the surface of the sample target; and the secondary ion realizes selection of the secondary ion (for example, the secondary ion having an interested or concerned mass-to-charge ratio) of a specific mass-to-charge ratio under the action of the mass analyzer, and then the selected secondary ion enters the ion detector to realize measurement of the inert gas.

The embodiments of the present invention provide a system for measuring an inert gas by an ion probe, which is an improvement of an ion probe instrument. There are many quality selection ways to the ion probe, including magnetic, quadrupole, time-of-flight, or the like; for example, the ion probe may be a magnetic ion probe, a quadrupole ion probe, or a time-of-flight ion probe; and the to-be-measured sample may be zircon, apatite, sphene, rutile, baddeleyite, or monazite.

Figure 1:
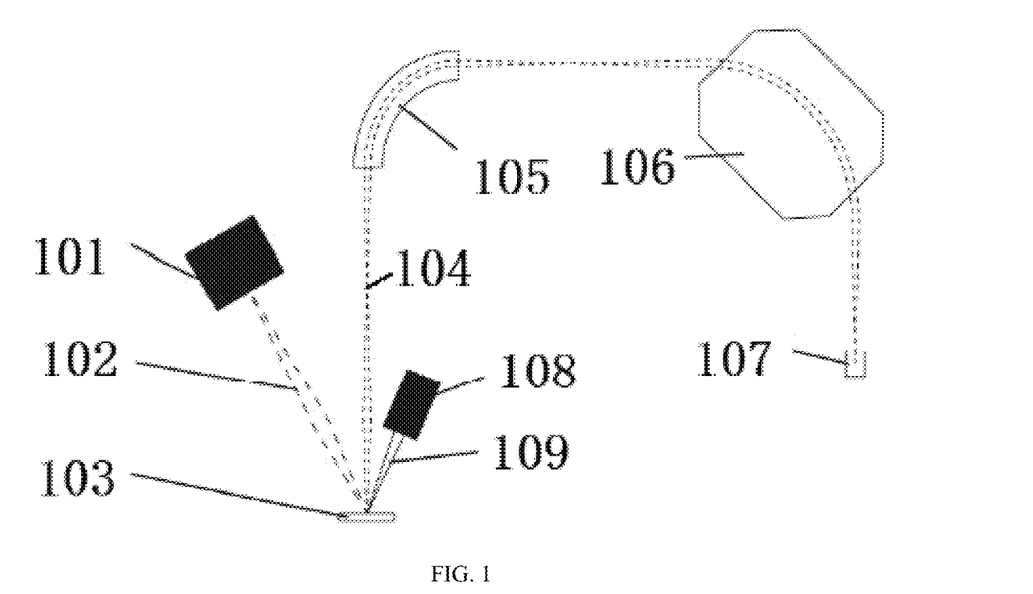
FIG. 1 is a schematic structural diagram of a system for measuring an inert gas by an ion probe according to an embodiment of the present invention.
Figure 2:
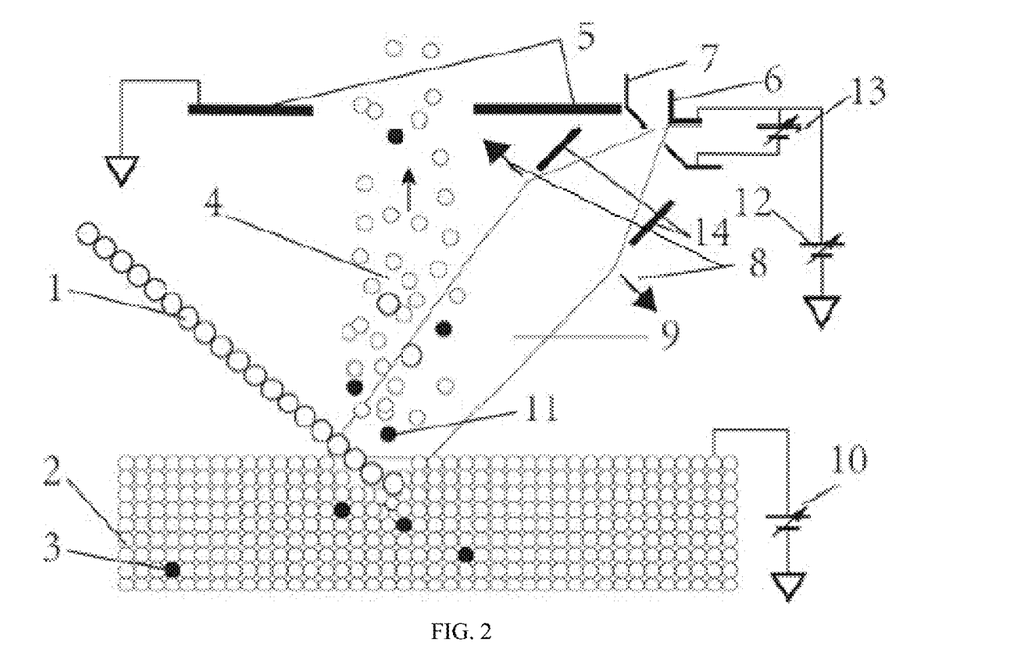
FIG. 2 is a schematic diagram of an ionization process of the inert gas in FIG. 1.
Figure 3:
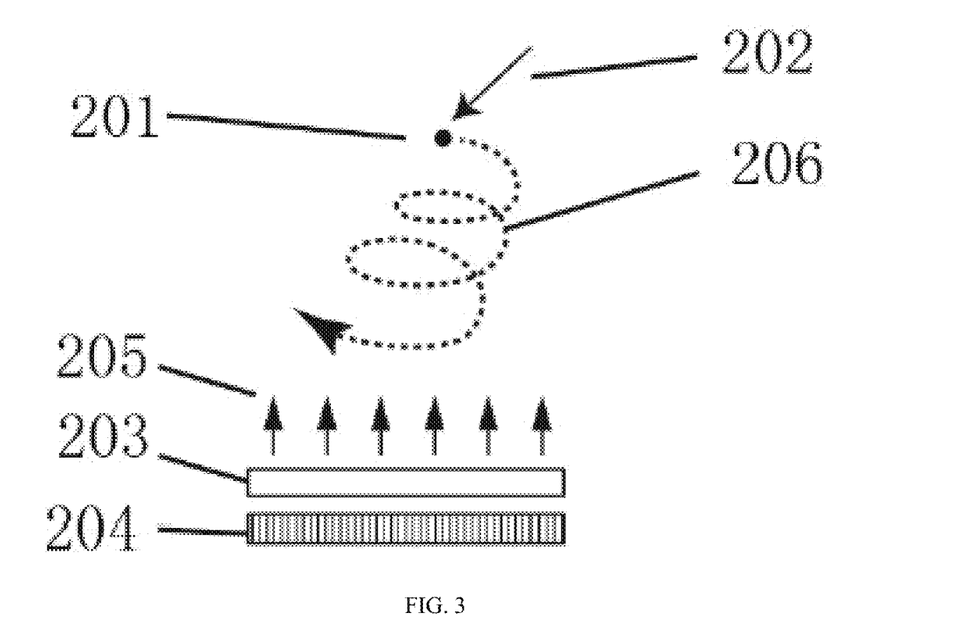
FIG. 3 is a schematic structural diagram of a magnetic backboard according to an embodiment of the present invention.

FIG. 1-FIG. 3 illustrate a modified structure of the system provided in the present invention where a double-focusing magnetic ion probe is taken as an example (which can be used for ion probe uranium/thorium-helium dating, and the inert gas is not limited to helium). The description is as follows, and it should be understood that the improvements of the disclosure are not limited to the contents mentioned below.

First, the system shown in FIG. 1 includes a primary ion source 101, an electron gun 108, an electrostatic analyzer 105, a magnetic field mass analyzer 106 (where the electrostatic analyzer 105 and the magnetic field mass analyzer 106 may collectively be referred to as a mass analyzer), and an ion detector 107. Thus, it can be seen that the electron gun 108 is added to the system of the disclosure, and the principle of which is described below.

The primary ion source 101 is used to emit primary ions (ion species include, but are not limited to, oxygen ions, cesium ions, argon ions, or the like). The ions emitted by the primary ion source have a certain energy, generally from tens of to tens of thousands of electron volts, and are focused by a corresponding ion optical system to form a primary ion beam 102. The primary ion beam is used to bombard a sample 103, thereby ablating the surface material of the sample such that some atoms and molecules obtain or lose electrons to form secondary ions, and these ions are subjected to extraction focusing to form a secondary ion beam 104.

In order to enable the analysis of inert gases, the electron gun 108 (which may also include corresponding machinery and/or circuitry) is specifically designed in the system of the disclosure to generate an electron beam 109 and focus on the surface of the sample so that the inert gas atoms that are ablated by the primary ion beam in the sample are ionized into ions (which can also increase the ionization efficiency of the inert gas), and therefore the inert gas ions can enter a subsequent analysis device for analysis. Subsequently, the secondary ion beam (including the ionized inert gas) completes the mass selection after passing through the mass analyzer composed of the electrostatic analyzer 105 and the magnetic field mass analyzer 106. Therefore, the ions having a specific mass-to-charge ratio (the ratio of mass to charge) are selected by the electrostatic analyzer 105 and the magnetic field mass analyzer 106 to obtain the ions finally enter the ion detector 107, thereby performing measurement of the inert gas (for example, performing intensity measurement to reflect the content of inert gas).

To further illustrate the principle of ionizing the inert gas in FIG. 1, a partial enlargement is made in the vicinity of the sample in FIG. 2. In FIG. 2, circles represent atoms, and larger circles represent primary ions 1. The primary ions 1 bombard the sample 2, and smaller circles represent atoms that constitute the sample 2. A voltage 10 is applied to the surface of the sample 2, which forms an electric field with a secondary ion extracting pole 5. The secondary ions generated at the time of bombardment from the primary ions 1 form a secondary ion beam 4 under the action of the electric field. The electron gun is mainly composed of an electron gun filament 6, an electron extracting pole 7, an electromagnetic lens 8, and an electron beam deflecting plate 14, where the electron gun filament 6 is heated by a relatively strong current, and the electron is easily escaped in the filament due to its small radius of curvature. Herein, the intensity of the current passing through the electron gun filament 6, and the voltage 13 between the electron gun filament 6 and the electron extracting pole 7 can be adjusted to control the current intensity of an emitted electron. It is also possible to focus the electrons onto the surface of the sample through the electromagnetic lens 8 to form a focused electron beam 9. In addition, it is possible to control the energy of the electron beam reaching the surface of the sample by adjusting an electron accelerating voltage 12. A voltage can be applied to the electron beam deflecting plate 14 to adjust the voltage value, thus adjusting the position of the electron beam on the sample so that a larger voltage can be applied to deflect the electron beam away from the surface of the sample when the electron beam is not required.

The system in the embodiments of the disclosure is highly sensitive because the released inert gas atoms (for example, helium atoms) do not need to fill the entire instrument, but are ionized by the focused electron beam near the surface of the sample, thereby greatly improving sensitivity and reducing the sample usage. Moreover, the system in the embodiments of the disclosure has a low background. Because only inert gas atoms on the electron beam path are likely to be ionized, and only ions located near the sample are likely to be extracted by the secondary ion path, the background is extremely low, the vacuum system requirements are low, and there is no need to maintain a very high static vacuum. In addition, the system in the embodiments of the disclosure can perform synchronous measurement, and since the inert gas ions and the remaining secondary ions enter the mass spectrometer synchronously, signal strength of the inert gas and other useful secondary ions (for example, helium, uranium, and thorium) can be simultaneously obtained at one sample position. In addition, the spatial resolution of the system in the embodiments of the disclosure is high, since the primary ion beam itself from sample ablation is focused on a small range, the inert gas released is derived from the region, and the introduced focused electron beam only acts on the surface position within the focus range, the uranium-thorium-helium dating method in the embodiments of the disclosure has higher spatial resolution. Furthermore, the system in the embodiments of the disclosure can provide a technique for performing in-situ measurement (for example, measuring the content) on an inert gas (for example, helium) in minerals by an ion probe.

It should be understood that an electron gun is added to the ion probe for generating a focused electron beam (the electron beam can coincide with the ion beam on the position of the surface of the sample to obtain the ionization effect better) in the embodiments of the disclosure. The primary ion beam is used to ablate the sample, generate secondary ions, and release the helium confined in the sample lattice. The focused electron beam performs ambient ionization on the released helium atoms to generate helium ions. Subsequently, the helium ions ionized by the electron beam and other secondary ions generated by the primary ions are measured in a high-precision mass spectrometer to achieve the measurement of the inert gas. In order to adjust the position of the primary ion beam and the electron beam to a same point, the secondary ions excited by the surface of the sample can be used to observe; for example, the primary ion beam can be started, the position of the primary ion beam is adjusted by the generated secondary ion image (where the secondary ion image may be directly imaged using an image sensor in ion microscope mode, or may be a scanned secondary ion image under an ion probe mode), so that the position of the primary ion beam bombardment coincides with the center of the secondary ion path; the position is recorded and then the primary ion beam is closed; then the electron beam is started, and the voltage applied to the electron beam deflecting plate is adjusted to adjust the focus position of the electron beam on the sample, thereby adjusting the position of the secondary ion excited by the electron beam to the foregoing recorded location; and at this time, the position of the electron beam and the ion beam can be adjusted to coincide with each other on the surface of the sample, to make the ionization effect better. The types of secondary ions used herein to align the primary ion beam and the electron beam include, but are not limited to hydrogen element. The intensity of the electron beam can be adjusted according to the content of inert gas in the sample (for example, 10 μA-300 μA), so that the ablated inert gas has a higher ionization efficiency (a ratio of the amount of the ionized inert gas to the amount of the ablated inert gas). The diameter of the electron beam may be equal to or slightly larger than the diameter of the ion beam, for example, the ion beam has a diameter ranging from 10 μm to 50 μm, to match the spatial resolution of the ion beam. The electron incident energy (that is, the energy that electrons have when they reach the surface of the sample) can range from −100 eV to 1000 eV (for example, 70 eV, where the energy is negative, which means that the electron acceleration potential is higher than the surface potential of the sample, so that the electron beam cannot actually reach the surface of the sample, but is reflected at a certain distance from the surface of the sample; and when the energy is positive, the electron beam acceleration potential is lower than the surface potential of the sample, the electron beam will reach the surface of the sample, and the difference in energy will affect the heating effect of the electron beam on the sample), and can be continuously adjusted, to find the lowest electron beam energy best suitable for ionization of the inert gas and keep the sample at a low temperature (the electron beam has a large current, if a larger energy is used, the sample will be heated significantly, thereby destroying the sample). The surface of the sample may be a positive voltage (for example, not less than 1000 V), to ensure the extraction efficiency of the secondary ion beam and the accuracy of the mass spectrometry. In addition, the He element has a large difference in mass from other elements required in the uranium/thorium-helium dating application, so it can be measured by using the single-collector peak-jumping mode. At this time, in order to reduce the heating effect of the electron gun on the sample, the electron gun can be incident on the surface of the sample only when measuring the He, and the other time is off from the surface of the sample by the deflection electrode.

Second, in the system of the disclosure, as an another improvement, in order to further reduce the influence of the background, a double vacuum pump system is further designed under the vacuum chamber in which the sample is placed in the ion probe. The traditional ion probe has only one turbo molecular pump for vacuumizing the sample chamber, while the pumping speed of the turbo molecular pump for small molecules such as hydrogen and helium is not ideal. Among the gases remaining inside the ion probe, hydrogen and helium are enriched in a large amount, which may cause a high background. Therefore, an ion pump special design for extracting the inert gas is added to the system of the disclosure, the ion pump uses a tantalum metal as a cathode, and the pumping rate on the inert gas is 6-20 times that of the ordinary ion pump. The ion pump is directly connected to the sample chamber, and there is an isolation valve between the ion pump and the molecular pump. When vacuum-pumping is started, the isolation valve is opened, and the molecular pump and its primary pump are used to pump the chamber to less than $1\times10^{-7}$ Pa; then the isolation valve is closed and the ion pump is started, and the ion pump is used to further improve the vacuum; and the experiment is started when the vacuum reaches $1\times10^{-8}$ Pa. For example, the ion pump can be an inert gas ion pump that optimizes the inert gas pumping efficiency.

Although an inert gas mass spectrometer can also be used to analyze inert gases, the inert gas mass spectrometer typically requires extremely high static vacuum (for example, requiring extremely high vacuum retention after closing all vacuum pumps), and is the most demanding static vacuum in conventional mass spectrometers. Since the air contains a certain amount of inert gas, a small amount of leakage during measurement or degas of the inner wall of the vacuum system may relate to the final measurement, causing measurement errors. However, the technique for measuring an inert gas by an ion probe in the embodiments of the disclosure determines that it does not need to reach an extremely high vacuum as that of an inert gas mass spectrometer, the reason is as follows: The vacuum system of the ion probe may have residual He and other inert gases, and the electron beam emitted by the electron gun has a distance of several millimeters before reaching the surface of the sample (at this time, in the vacuum space on the path of the electron beam from the electron gun to the surface of the sample, the residual inert gas may be ionized by the electron beam, thereby interfering with the measurement), however, in the technique used in the disclosure, although these inert gas are ionized, only ions in a very small area near the surface of the sample can be transported by the secondary ion extraction path and enter the mass spectrometer, and therefore, it does not affect the measurement of the inert gas in the sample. Moreover, since the ionization of the inert gas in the system of the embodiments of the disclosure occurs on the surface of the sample, and the ionized inert gas can be directly extracted, the sensitivity of the system in the embodiments of the disclosure is higher than that of the conventional inert gas mass spectrometer.

As an example, assume that the distance from the sample surface to the extraction electrode is 5 mm, and the bandwidth limit of the secondary ion energy is 50 eV, for a 10000 V secondary ion acceleration voltage, the ions that can enter the mass spectrometer must be within 25 μm height of the sample surface; since this range is very small, even if there are inert gas ions in the vacuum space, the effect on the measurement is small. In addition, if the field aperture on the secondary ion path is used to set that only ions generated within 30 μm in diameter pass through, the volume of the background that may have an influence on the measurement is only about $1.7\times10^{-5}$ mm$^3$, namely, most of the background signal do not enter the mass spectrometer to participate in the analysis, which greatly reduces the problem of high background of the ion probe due to relative poor vacuum conditions. For example, if all the residual gases in the vacuum chamber of the ion probe are He, according to the calculation formula (n=P/(KB*K), where n is the number of molecules, P is the pressure in the chamber, KB is a Boltzmann constant, and K is Kelvin temperature), the background density of He under this condition is $2\times10^{-6}$/m$^3$. If the sample contains 0.1 ppm (one in a million) of He, 10 nA primary ions are used for ablation, the mass of the ablated sample in 10 minutes is about 3 ng, where the contained He atoms are about $4\times10^7$, and the He atoms released to the space every second are $8\times10^4$. If it is evenly distributed in the range of $1.2\times10^4$ μm$^3$ (that is, the range that can be collected by the secondary path of the ion probe), its density is about 6/μm$^3$, much higher than the background. Therefore, this vacuum background is suitable for most sample analysis.

Furthermore, in the system of the disclosure, as a further improvement, as shown in FIG. 3, the disclosure also adds a magnetic material (for example, a magnetic backboard) behind the to-be-measured sample to form a magnetic field perpendicular to the surface of the sample. This is because the current intensity of the electron beam emitted by the electron gun becomes greater, the probability that the He atoms in space are ionized is greater, and the analytical sensitivity is higher; however, in this way, the heating effect produced by the corresponding electron beam reaching the surface of the sample is stronger, which may cause irreversible damage to the sample. Therefore, in order to ensure the analytical sensitivity of the inert gas under lower current intensity of the electron beam, the disclosure adds a magnetic material behind the to-be-measured sample to form a magnetic field perpendicular to the surface of the sample (referred to as "magnetic backboard technology"), as shown in the figure. In the figure, 201 is the electron emitted by the electron gun, 202 is the direction when electrons are incident near the surface of the sample, 203 is the sample, and 204 is the magnetic backboard under the sample. The magnetic backboard 204 forms a magnetic field 205 perpendicular to the surface of the sample above the sample 203. The direction of the magnetic field may be the same as or opposite to the direction indicated by the arrow in FIG. 3 (preferably, without other included angles). Under this condition, after the electron beam enters the magnetic field range, it will rotate under the action of the Lorentz force, and after being combined with the original motion direction, the final motion path is substantially spiral 206. This greatly increases the path of electrons reaching the surface of the sample, thereby increasing the probability of collision between electrons and inert gas atoms, so as to increase the analytical sensitivity of the inert gas at lower current intensity of the electron beam.

As an example, as shown in FIG. 3, the path of the electron gun can be extended by increasing the magnetic field of the surface of the sample, thereby increasing the ionization efficiency of the inert gas. For example, using the magnetic backboard technology, the magnetic field on the surface of the sample is generated by a permanent magnet material backboard, where the direction of the magnetic field is perpendicular to the sample direction as shown in FIG. 3, and there is an angle between the incident direction of the electron and the direction of the magnetic field. Therefore, according to the Lorentz force, the Lorentz force is applied to the electron in a direction perpendicular to the magnetic field and the electron performs a quasi-circular motion, thereby increasing the length of the movement trajectory of electrons reaching to the surface of the sample, which increases the probability of electrons colliding with inert gas atoms released from the surface of the sample. For the secondary ions leaving from the surface of the sample, although in the range of the magnetic field, its direction of motion is parallel to the direction of the magnetic field, and thus is hardly affected by the Lorentz force. Only some of the obliquely emitted ions are affected by the Lorentz force, but after replacing the permanent magnetic backboard, the distortion can be reduced by re-adjusting the focus of the secondary ion system, and this measure is suitable for samples with low inert gas content. Preferably, in order to adjust the strength of the introduced magnetic field, a series of magnetic backboards of different thicknesses and materials can be further fabricated to select the magnetic field strength of the backboard as appropriate depending on the condition of the sample.

According to the embodiments of the disclosure, in the disclosure, a magnetic backboard is arranged at the back of the sample target, and the magnetic backboard is configured to form a magnetic field in a direction perpendicular to the surface of the sample target such that the electron beam moves along a substantially helical path after entering the magnetic field formed by the magnetic backboard.

The embodiments of the disclosure further provide a method for measuring an inert gas by an ion probe. The method includes: embedding a to-be-measured sample into an epoxy resin, to obtain a sample target, where the to-be-measured sample includes an inert gas atom; after putting the obtained sample target into an analysis chamber of the ion probe, vacuumizing the analysis chamber, where the ion probe includes a primary ion source, an electron gun, a mass analyzer, and an ion detector; bombarding the sample target by using a primary ion beam formed by the primary ion source to release the inert gas atom in the sample target; ionizing the released inert gas atom by using an electron beam formed by the electron gun to form an inert gas ion; and analyzing a secondary ion containing the inert gas ion by using the mass analyzer and the ion detector to achieve measurement of the inert gas.

According to the embodiments of the disclosure, the primary ion beam formed by the primary ion source and the electron beam formed by the electron gun coincide with each other at a position on the surface of the sample target.

According to the embodiments of the disclosure, the electron gun includes an electron gun filament, an electron extracting pole, an electromagnetic lens, and an electron beam deflecting plate; the electron gun filament forms and emits an electron under the current heating; the intensity of the current passing through the electron gun filament, and the voltage between the electron gun filament and the electron extracting pole can be adjusted to control the current intensity of an emitted electron; the electromagnetic lens is configured to focus the electron onto the surface of the sample target to form the electron beam; the voltage on the electron beam deflecting plate can be adjusted to change the position of the electron beam on the surface of the sample target.

According to the embodiments of the disclosure, the secondary ion realizes selection of the secondary ion of a specific mass-to-charge ratio under the action of the mass analyzer, and then the selected secondary ion enters the ion detector to realize measurement of the inert gas.

According to the embodiments of the disclosure, when the analysis chamber is vacuumized, a turbo molecular pump and an ion pump are simultaneously used, the ion pump is connected with the analysis chamber, and an isolation valve is placed between the turbo molecular pump and the ion pump; and the isolation valve is opened during the analysis chamber is vacuumized, after the analysis chamber is pumped to below $1 \times 10^{-7}$ Pa with the turbo molecular pump, and then the isolation valve is closed and the ion pump is turned on to further vacuumize to $1 \times 10^{-8}$ Pa.

According to the embodiments of the disclosure, a magnetic backboard is arranged at the back of the sample target, and the magnetic backboard is configured to form a magnetic field in a direction perpendicular to the surface of the sample target such that the electron beam moves along a substantially helical path after entering the magnetic field formed by the magnetic backboard.

According to the embodiments of the disclosure, when the to-be-measured sample is embedded in the epoxy resin to obtain the sample target, a standard sample is embedded in the same mount; and after measuring an inert gas at a position on the sample target corresponding to the to-be-measured sample, the method further includes: bombarding the position on the sample target corresponding to the standard sample by using the primary ion beam, to release an inert gas atom in the standard sample; ionizing the inert gas atom released from the standard sample by using the electron beam, to obtain an inert gas ion of the standard sample; analyzing a secondary ion containing the inert gas ion of the standard sample by using the mass analyzer and the ion detector; and calibrating an analysis result of the to-be-measured sample by using an analysis result of the standard sample, thereby obtaining a corrected measurement result of the inert gas of the to-be-measured sample. For example, the standard sample may be a sample having a known inert gas content.

According to the embodiments of the disclosure, the ion probe may be a magnetic ion probe, a quadrupole ion probe, or a time-of-flight ion probe; and the to-be-measured sample may be zircon, apatite, sphene, rutile, baddeleyite, or monazite.

The process of the method for measuring an inert gas by an ion probe provided in the present invention is described by taking a double-focusing magnetic ion probe shown in FIG. 1 to FIG. 3 as an example. The example steps are described in detail below.

Step 102: sample preparation: embedding a to-be-measured sample into an epoxy resin, to obtain a sample target, where the to-be-measured sample includes an inert gas atom.

Preferably, when the to-be-measured sample is embedded in the epoxy resin to obtain the sample target, a standard sample is embedded in the same mount; and an analysis result of the to-be-measured sample is corrected by using an analysis result of the standard sample, thereby obtaining a corrected measurement result of the inert gas in the to-be-measured sample, which will be described in detail later.

For example, in step 102, the example method is embedding a to-be-measured sample (including zircon, apatite, sphene, baddeleyite, rutile, monazite, or the like, further including a standard sample with the same matrix as the to-be-measured sample) into an epoxy resin, to obtain a sample target, where the specific steps may include, for example, the following steps:

a. sticking a double-sided tape on a flat glass plate, and flattening the double-sided tape as much as possible to avoid bubbles and wrinkles; and sticking the to-be-measured sample and the corresponding standard sample on the double-sided tape, for example, where different instrument manufacturers have different requirements for sample targets, a common one-inch diameter circular target is used, and all samples can be stuck in a circle of one inch by using the circular target as an example (for example, the sample at the edge of the target is affected by the uniformity of the electric field, which deteriorates the measurement accuracy, and therefore, the sample is generally concentrated in a range of 14 mm of the diameter to the center of the circle);

b. using a mold (for example, a circular sleeve having an inner diameter of one inch) to sleeve on the sample prepared in step b, where one end of the mold is adhered to the double-sided tape;

c. pouring the epoxy resin liquid with coagulating liquid from the other end of the mold, quickly putting it into a vacuum chamber for vacuumizing (about $1\times10^{-1}$ Pa) and keeping it in the vacuum environment for several hours (also from hours to days according to resin requirements) for curing;

e. removing the mold, glass, and double-sided tape to obtain a solid sample target. If the sample has only a small surface exposed and the surface is uneven, the following steps may be further included: f. polishing the target to expose the larger surface of the sample and obtain a smoother surface; g. drying by using alcohol and deionized water after several ultrasonic cleanings; and h. coating gold or carbon, making its surface conductive.

Step 104: after putting the obtained sample target into an analysis chamber of the ion probe, vacuumizing the analysis chamber, where the ion probe includes a primary ion source, an electron gun, a mass analyzer (for example, in the case of a magnetic ion probe, the mass analyzer may include an electrostatic analyzer and a magnetic field mass analyzer), and an ion detector.

Preferably, when the analysis chamber is vacuumized, a turbo molecular pump and an ion pump are used in sequence, the ion pump is connected to the analysis chamber, and an isolation valve is placed between the turbo molecular pump and the ion pump; and the isolation valve is first opened when the analysis chamber is vacuumized, the analysis chamber is vacuumized to below $1\times10^{-7}$ Pa with the turbo molecular pump, and then the isolation valve is closed and the ion pump is started to further vacuumize to $1\times10^{-8}$ Pa.

For example, in step 104, the vacuumizing in the example method is: after putting the obtained sample target into an analysis chamber of the ion probe, vacuumizing the analysis chamber. The specific steps may include, for example, the following steps: before the sample target is formally placed in the analysis position of the analysis chamber, performing for vacuum in the vacuum chamber connected to the instrument, and transferring the sample to the analysis chamber of the instrument when the vacuum is better than $1\times10^{-7}$ Pa. When the vacuum is better than $1\times10^{-8}$ Pa, the analysis can be started.

Step 106: bombarding the sample target by using a primary ion beam formed by the primary ion source to release the inert gas atom in the sample target; ionizing the released inert gas atom by using an electron beam formed by the electron gun to form an inert gas ion; and analyzing a secondary ion containing the inert gas ion by using the mass analyzer and the ion detector to measure the inert gas.

Preferably, the secondary ion realizes selection of the secondary ion of a specific mass-to-charge ratio under the action of the mass analyzer (for example, in the case of a magnetic ion probe, under the action of the electric field of the electrostatic analyzer and under the action of the magnetic field of the magnetic field mass analyzer), and then the selected secondary ion enters the ion detector to realize measurement of the inert gas.

For example, in step 106, the mass-spectrometer measurement in the example method includes: bombarding the sample target by using a primary ion beam formed by the primary ion source to release the inert gas atom in the sample target; ionizing the released inert gas atom by using an electron beam formed by the electron gun to form an inert gas ion; and analyzing a secondary ion containing the inert gas ion by using the subsequent mass spectrometer to achieve measurement of the inert gas. The specific steps may include, for example, the following steps.

1) $O^-$ or $O_2^-$ ions are used as a primary ion beam (containing primary ions), the acceleration voltage may be $-10$ KV to $-15$ KV, and $+1$ KV to $+10$ KV can be applied to the sample;

2) the primary ion beam is scanned on the sample surface for a certain period of time to remove a gold layer or a carbon layer in a small area (generally in the range of tens to thousands of square micrometers) on the surface of the sample, to expose the sample, so that the analysis is free from impurity interference; and 3) the primary ion beam intensively bombards the measured point, at this time, the inert gas atoms 3 imprisoned in the sample in FIG. 2 can be released by ablation from the primary ion beam, and it is extremely difficult to ionize in the ion collision, thus maintaining the electrically neutral atomic state. When the inert gas atom is released, it is immediately bombarded by the focused electron beam 9 emitted by the electron gun, thereby forming inert gas ions 11 on the surface of the sample, and entering the mass analyzer (for example, in the case of a magnetic ion probe, it may be a dual focus mass spectrometer consisting of an electrostatic analyzer and a magnetic field mass analyzer) together with other secondary ions to perform measurement.

The magnetic field intensity of the ion probe can be changed to select the mass number of the desired element or isotope for performing intensity measurement, in one measurement cycle, the measured ion species include but are not limited to: $^4He^+$, $^{204}Pb^+$, $^{206}Pb^+$, $^{207}Pb^+$, $^{208}Pb^+$, $^{238}U^+$, $^{232}Th^+$, $^{238}U^{16}O^+$, $^{238}U^{16}O_2^+$, $^{238}Th^{16}O_2^+$, $^{238}Th^{16}O_2^+$, a characteristic reference ion of the measured mineral (usually a combination of elements in a mineral formula, for zircons, typically a combination of some of Zr, Si, and O, such as $Zr_2O^+$), and the measurement time of each element is determined by its signal strength and its accuracy requirements. When $^4He^+$ ions are measured, the electron beam can be controlled to bombard the surface of the sample and ionize the He atoms; and when the remaining ions are measured, the electron beam can be deflected away from the surface of the sample, thereby reducing the heating effect of the electron beam on the sample.

As an example, if an ion probe such as a time-of-flight pulse detection method is used, the pulse timing of the electron beam should be synchronized with the pulse timing of the primary ion beam so that the electron beam and the ion beam simultaneously reach the surface of the sample during bombardment. This avoids the heating effect caused by long-term bombardment from the electron beam, and also reduces the mass spectrometry interference caused by the electron beam ionizing other elements on the surface of the sample. Multiple analysis pulses are required to be repeated to accumulate enough signal.

According to the preferred embodiments of the disclosure, the primary ion beam formed by the primary ion source and the electron beam formed by the electron gun may coincide with each other at a position on the surface of the sample target. For example, before step 106, a step 108 (ion beam and electron beam aiming) may be included: in order to achieve a better analytical effect, the electron beam may coincide with the area covered by the ion beam on the sample. For example, the primary ion beam can ablate a pit on the surface of the sample, therefore, after a period of ion beam ablation, the covering position can be observed by a sample optical microscope, but since the electron beam itself does not leave an optical microscope-visible trace on the sample, the operation must be achieved by means of the image function of the ion probe itself. Because most of the ion probes have an image function, for example, when an ion probe mode is used, a secondary ion image can be formed by scanning a primary beam on the sample surface, and for another example, when an ion microscope mode is used, a direct secondary ion image can be displayed on the image detector. The image can be used to reflect the incident position of the primary ion. In addition, the electron beam can ionize some light-weight elements, so these elements can also be used to observe the incident position of the electron beam. For example, by adjusting the voltage applied to the electron beam deflecting plate in FIG. 2, the incident position of the electron gun can be adjusted, and the position is adjusted to coincide with the exciting position of the primary ion. In addition, on a flat ion probe target surface, the relative positions of the two do not vary significantly. However, after the sample is changed, it is necessary to confirm or fine-tune the coincidence situation due to slight differences in the height of each target surface.

According to the preferred embodiments of the disclosure, in step 102, if the to-be-measured sample is embedded in the epoxy resin to make the sample target, a standard sample is simultaneously embedded in the epoxy resin, after measuring an inert gas at a position on the sample target corresponding to the to-be-measured sample, the method of the embodiments of the disclosure further includes: bombarding the position on the sample target corresponding to the standard sample by using the primary ion, to release an inert gas atom in the standard sample; ionizing the inert gas atom released from the standard sample by using the electron beam, to obtain an inert gas ion of the standard sample; analyzing a secondary ion containing the inert gas ion of the standard sample by using the electrostatic analyzer, the magnetic field mass analyzer and the ion detector; and correcting an analysis result of the to-be-measured sample by using an analysis result of the standard sample, thereby obtaining a corrected measurement result of the inert gas in the to-be-measured sample.

For example, after step 106, a step 110 (measurement and correction of the content of inert gases such as He) may be included: when the ion probe measures different samples, the yield of different elements or even the yield between isotopes may be different, therefore, the standard sample can be used for fractionation correction (for example, the standard sample prepared in step 102 and the to-be-measured sample are simultaneously prepared in the sample target). For example, for content analysis, a standard sample (for example, a standard mineral) having the same matrix (for example, the same mineral or other material) with the to-be-measured sample and the known characteristic element content or isotope ratio can be measured with the to-be-measured sample, And the relative yield is reflected by the ratio of the intensity of the characteristic element to the intensity of an internal standard element (usually a ion of a major element or several major elements of the matrix, such as the matrix ion $Zr_2O^+$ commonly used in zircon analysis). Thus, the content of the characteristic elements in the to-be-measured sample can be further calculated by comparing the yields of the to-be-measured sample and the standard sample. As shown in the following formula, the letter C indicates the content of the characteristic element, I indicates the intensity of the element during analysis, M indicates the measured intensity of the matrix signal, the subscript "unknown" indicates the to-be-measured sample, and the subscript "standard" indicates the standard sample for analysis under the same measurement conditions.

$$C_{unknown} = \frac{I_{unknown}/M_{unknown}}{I_{standard}/M_{standard}} \times C_{standard}$$

For the analysis of the content of inert gases such as He in minerals, a similar calculation scheme is also used. For example, the measured intensity data may not directly reflect the content of the inert gas, and therefore, can be corrected by using the standard sample. At this point, the content of each element can be calculated, to be specific, the U/Th—He age can be calculated more accurately.

The embodiments of the disclosure provide a method and system for measuring an inert gas (for example, the content of the inert gas) by an ion probe, which enables the use of the ion probe in the micro-domain or in situ analysis of the measurement of the content of the inert gas in minerals, for example, for the analysis of uranium/thorium-niobium age of minerals.

Through the foregoing description of the embodiments, it is apparent to those skilled in the art that the present invention may be implemented by other structures, and the features of the present invention are not limited to the foregoing preferred embodiments. Any changes or modifications that may be readily conceived by those skilled in the art in the technical field of the present invention are intended to fall within the protection scope of the present invention.

What is claimed is:

1. A method for measuring an inert gas by an ion probe, comprising:
   embedding a to-be-measured sample into an epoxy resin, to obtain a sample target, wherein the to-be-measured sample comprises an inert gas atom;
   after putting the obtained sample target into an analysis chamber of the ion probe, vacuumizing the analysis chamber, wherein the ion probe comprises a primary ion source, an electron gun, a mass analyzer, and an ion detector;
   bombarding the sample target by using a primary ion beam formed by the primary ion source to release the inert gas atom in the sample target;
   ionizing the released inert gas atom by using an electron beam formed by the electron gun to form an inert gas ion; and
   analyzing a secondary ion containing the inert gas ion by using the mass analyzer and the ion detector to achieve measurement of the inert gas.

2. The method according to claim 1, wherein the primary ion beam formed by the primary ion source and the electron beam formed by the electron gun coincide with each other at a position on the surface of the sample target.

3. The method according to claim 1, wherein the electron gun comprises an electron gun filament, an electron extracting pole, an electromagnetic lens, and an electron beam deflecting plate; the electron gun filament forms and emits an electron under the current heating; the intensity of the current passing through the electron gun filament, and the voltage between the electron gun filament and the electron extracting pole can be adjusted to control the current intensity of an emitted electron; the electromagnetic lens is configured to focus the electron onto the surface of the sample target to form the electron beam; and the voltage on the electron beam deflecting plate can be adjusted to change the position of the electron beam on the surface of the sample target.

4. The method according to claim 1, wherein the mass analyzer realizes selection of the secondary ion of a specific mass-to-charge ratio, and then the selected secondary ion enters the ion detector to realize measurement of the inert gas.

5. The method according to claim 1, wherein when the analysis chamber is vacuumized, a turbo molecular pump and an ion pump are simultaneously used, the ion pump is connected to the analysis chamber, and an isolation valve is placed between the turbo molecular pump and the ion pump; and the isolation valve is first opened when the analysis chamber is vacuumized, the analysis chamber is vacuumized to below $1\times10^{-7}$ Pa with the turbo molecular pump, and then the isolation valve is closed and the ion pump is started to further vacuumize to $1\times10^{-8}$ Pa.

6. The method according to claim 1, wherein a magnetic backboard is arranged at the back of the sample target, and the magnetic backboard is configured to form a magnetic field in a direction perpendicular to the surface of the sample target such that the electron beam moves along a substantially helical path after entering the magnetic field formed by the magnetic backboard.

7. The method according to claim 1, wherein when the to-be-measured sample is embedded in the epoxy resin to obtain the sample target, a standard sample is embedded in the epoxy resin; and after measuring an inert gas at a position on the sample target corresponding to the to-be-measured sample, the method further comprises:
   bombarding the position on the sample target corresponding to the standard sample by using the primary ion, to release an inert gas atom in the standard sample;
   ionizing the inert gas atom released from the standard sample by using the electron beam, to obtain an inert gas ion of the standard sample;
   analyzing a secondary ion containing the inert gas ion of the standard sample by using the mass analyzer and the ion detector; and
   calibrating an analysis result of the to-be-measured sample by using an analysis result of the standard sample, thereby obtaining a corrected measurement result of the inert gas of the to-be-measured sample.

8. The method according to claim 1, wherein the ion probe is a magnetic ion probe, a quadrupole ion probe, or a time-of-flight ion probe; and the to-be-measured sample is zircon, apatite, sphene, rutile, baddeleyite, or monazite.

9. A system for measuring an inert gas by an ion probe, wherein the system uses the method according to claim 1 to measure the inert gas, and the system comprises a primary ion source, an electron gun, a mass analyzer, and an ion detector; wherein
   the electron gun comprises an electron gun filament, an electron extracting pole, an electromagnetic lens, and an electron beam deflecting plate; the electron gun filament forms and emits an electron under the current heating; the intensity of the current passing through the electron gun filament, and the voltage between the electron gun filament and the electron extracting pole can be adjusted to control the current intensity of an emitted electron; the electromagnetic lens is configured to focus the electron onto the surface of the sample target to form the electron beam; the voltage on the electron beam deflecting plate can be adjusted to change the position of the electron beam on the surface of the sample target; and
   the secondary ion realizes selection of the secondary ion of a specific mass-to-charge ratio under the action of the mass analyzer, and then the selected secondary ion enters the ion detector to realize measurement of the inert gas.

10. The system according to claim 9, wherein a magnetic backboard is arranged at the back of the sample target, and the magnetic backboard is configured to form a magnetic field in a direction perpendicular to the surface of the sample target such that the electron beam moves along a substantially helical path after entering the magnetic field formed by the magnetic backboard.

11. The method according to claim 2, wherein the electron gun comprises an electron gun filament, an electron extracting pole, an electromagnetic lens, and an electron beam deflecting plate; the electron gun filament forms and emits an electron under the current heating; the intensity of the current passing through the electron gun filament, and the voltage between the electron gun filament and the electron extracting pole can be adjusted to control the current intensity of an emitted electron; the electromagnetic lens is configured to focus the electron onto the surface of the sample target to form the electron beam; and the voltage on the electron beam deflecting plate can be adjusted to change the position of the electron beam on the surface of the sample target.

12. The method according to claim 2, wherein the mass analyzer realizes selection of the secondary ion of a specific mass-to-charge ratio, and then the selected secondary ion enters the ion detector to realize measurement of the inert gas.

13. The method according to claim 2, wherein when the analysis chamber is vacuumized, a turbo molecular pump and an ion pump are simultaneously used, the ion pump is connected to the analysis chamber, and an isolation valve is placed between the turbo molecular pump and the ion pump; and the isolation valve is first opened when the analysis chamber is vacuumized, the analysis chamber is vacuumized to below $1\times10^{-7}$ Pa with the turbo molecular pump, and then the isolation valve is closed and the ion pump is started to further vacuumize to $1\times10^{-8}$ Pa.

14. The method according to claim 2, wherein a magnetic backboard is arranged at the back of the sample target, and the magnetic backboard is configured to form a magnetic field in a direction perpendicular to the surface of the sample target such that the electron beam moves along a substantially helical path after entering the magnetic field formed by the magnetic backboard.

15. The method according to claim 2, wherein when the to-be-measured sample is embedded in the epoxy resin to obtain the sample target, a standard sample is embedded in the epoxy resin; and after measuring an inert gas at a position on the sample target corresponding to the to-be-measured sample, the method further comprises:
   bombarding the position on the sample target corresponding to the standard sample by using the primary ion, to release an inert gas atom in the standard sample;
   ionizing the inert gas atom released from the standard sample by using the electron beam, to obtain an inert gas ion of the standard sample;
   analyzing a secondary ion containing the inert gas ion of the standard sample by using the mass analyzer and the ion detector; and
   calibrating an analysis result of the to-be-measured sample by using an analysis result of the standard sample, thereby obtaining a corrected measurement result of the inert gas of the to-be-measured sample.

16. The method according to claim 2, wherein the ion probe is a magnetic ion probe, a quadrupole ion probe, or a time-of-flight ion probe; and the to-be-measured sample is zircon, apatite, sphene, rutile, baddeleyite, or monazite.

17. A system for measuring an inert gas by an ion probe, wherein the system uses the method according to claim 2 to measure the inert gas, and the system comprises a primary ion source, an electron gun, a mass analyzer, and an ion detector; wherein
the electron gun comprises an electron gun filament, an electron extracting pole, an electromagnetic lens, and an electron beam deflecting plate; the electron gun filament forms and emits an electron under the current heating; the intensity of the current passing through the electron gun filament, and the voltage between the electron gun filament and the electron extracting pole can be adjusted to control the current intensity of an emitted electron; the electromagnetic lens is configured to focus the electron onto the surface of the sample target to form the electron beam; the voltage on the electron beam deflecting plate can be adjusted to change the position of the electron beam on the surface of the sample target; and
the mass analyzer realizes selection of the secondary ion of a specific mass-to-charge ratio, and then the selected secondary ion enters the ion detector to realize measurement of the inert gas.

18. A system for measuring an inert gas by an ion probe, wherein the system uses the method according to claim 3 to measure the inert gas, and the system comprises a primary ion source, an electron gun, a mass analyzer, and an ion detector; wherein
the electron gun comprises an electron gun filament, an electron extracting pole, an electromagnetic lens, and an electron beam deflecting plate; the electron gun filament forms and emits an electron under the current heating; the intensity of the current passing through the electron gun filament, and the voltage between the electron gun filament and the electron extracting pole can be adjusted to control the current intensity of an emitted electron; the electromagnetic lens is configured to focus the electron onto the surface of the sample target to form the electron beam; the voltage on the electron beam deflecting plate can be adjusted to change the position of the electron beam on the surface of the sample target; and
the mass analyzer realizes selection of the secondary ion of a specific mass-to-charge ratio, and then the selected secondary ion enters the ion detector to realize measurement of the inert gas.

19. A system for measuring an inert gas by an ion probe, wherein the system uses the method according to claim 5 to measure the inert gas, and the system comprises a primary ion source, an electron gun, a mass analyzer, and an ion detector; wherein
the electron gun comprises an electron gun filament, an electron extracting pole, an electromagnetic lens, and an electron beam deflecting plate; the electron gun filament forms and emits an electron under the current heating; the intensity of the current passing through the electron gun filament, and the voltage between the electron gun filament and the electron extracting pole can be adjusted to control the current intensity of an emitted electron; the electromagnetic lens is configured to focus the electron onto the surface of the sample target to form the electron beam; the voltage on the electron beam deflecting plate can be adjusted to change the position of the electron beam on the surface of the sample target; and
the mass analyzer realizes selection of the secondary ion of a specific mass-to-charge ratio, and then the selected secondary ion enters the ion detector to realize measurement of the inert gas.

20. A system for measuring an inert gas by an ion probe, wherein the system uses the method according to claim 7 to measure the inert gas, and the system comprises a primary ion source, an electron gun, a mass analyzer, and an ion detector; wherein
the electron gun comprises an electron gun filament, an electron extracting pole, an electromagnetic lens, and an electron beam deflecting plate; the electron gun filament forms and emits an electron under the current heating; the intensity of the current passing through the electron gun filament, and the voltage between the electron gun filament and the electron extracting pole can be adjusted to control the current intensity of an emitted electron; the electromagnetic lens is configured to focus the electron onto the surface of the sample target to form the electron beam; the voltage on the electron beam deflecting plate can be adjusted to change the position of the electron beam on the surface of the sample target; and
the mass analyzer realizes selection of the secondary ion of a specific mass-to-charge ratio, and then the selected secondary ion enters the ion detector to realize measurement of the inert gas.

* * * * *